United States Patent
Koo et al.

(10) Patent No.: US 10,389,254 B2
(45) Date of Patent: Aug. 20, 2019

(54) CABLE COMPENSATION CIRCUIT AND POWER SUPPLY INCLUDING THE SAME

(71) Applicant: FAIRCHILD KOREA SEMICONDUCTOR LTD., Bucheon (KR)

(72) Inventors: Gwanbon Koo, Bucheon-si (KR); Taesung Kim, Suwon-si (KR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 1070 days.

(21) Appl. No.: 14/091,978

(22) Filed: Nov. 27, 2013

(65) Prior Publication Data

US 2014/0146580 A1 May 29, 2014

Related U.S. Application Data

(60) Provisional application No. 61/730,169, filed on Nov. 27, 2012.

(30) Foreign Application Priority Data

Nov. 1, 2013 (KR) .................. 10-2013-0132380

(51) Int. Cl.
*H02M 3/335* (2006.01)
*H02M 1/00* (2006.01)

(52) U.S. Cl.
CPC .............. *H02M 3/33523* (2013.01); *H02M 2001/0025* (2013.01)

(58) Field of Classification Search
CPC ............ H02M 3/335; H02M 3/33507; H02M 3/33523; H02M 2001/0016; H02M 2001/0019; H02M 2001/0025
USPC ............................................. 363/21.01–21.18
See application file for complete search history.

(56) References Cited

U.S. PATENT DOCUMENTS

| | | | | |
|---|---|---|---|---|
| 4,347,740 A | * | 9/1982 | Townsend | G01R 27/2605 324/677 |
| 7,679,939 B2 | * | 3/2010 | Gong | H02M 3/33507 363/21.15 |
| 8,362,790 B2 | * | 1/2013 | Lee | G01R 19/0084 324/713 |
| 8,824,172 B2 | * | 9/2014 | Chen | H02M 3/33507 363/21.12 |
| 2002/0136031 A1 | * | 9/2002 | Yamaguchi | H02M 3/3385 363/18 |
| 2002/0141205 A1 | * | 10/2002 | Kitano | H02M 3/33523 363/16 |

(Continued)

*Primary Examiner* — Gary L Laxton
*Assistant Examiner* — Ivan Laboy
(74) *Attorney, Agent, or Firm* — AMPACC Law Group, PLLC

(57) ABSTRACT

A cable compensation circuit compensates a voltage drop in a cable coupled between a power supply and a load. The cable compensation circuit includes: a node where a voltage that depends on an input voltage of the power supply during a turn-on period of a power switch of the power supply and depends on an output voltage of the power supply during a turn-off period of the power switch is generated; a sensing RC filter generating a sense voltage that depends on a diode current by filtering the voltage of the node; and an averaging RC filter generating an average voltage by averaging the sense voltage.

20 Claims, 3 Drawing Sheets

(56) References Cited

U.S. PATENT DOCUMENTS

| | | | |
|---|---|---|---|
| 2003/0076698 A1* | 4/2003 | Sully, III | H02M 7/06 |
| | | | 363/125 |
| 2010/0008108 A1* | 1/2010 | Xiaowu | H02M 3/33523 |
| | | | 363/21.15 |
| 2010/0039836 A1* | 2/2010 | Gong | H02M 3/156 |
| | | | 363/21.13 |
| 2010/0164443 A1* | 7/2010 | Tumminaro | H02M 3/33507 |
| | | | 323/247 |
| 2011/0140683 A1* | 6/2011 | Zilberberg | H02J 9/06 |
| | | | 323/311 |
| 2012/0069609 A1* | 3/2012 | Christophe | H02M 3/33523 |
| | | | 363/21.12 |
| 2013/0155724 A1* | 6/2013 | Baurle | H02M 1/42 |
| | | | 363/15 |
| 2014/0159678 A1* | 6/2014 | Park | G05F 1/10 |
| | | | 323/229 |

\* cited by examiner

CABLE COMPENSATION CIRCUIT AND POWER SUPPLY INCLUDING THE SAME

CROSS-REFERENCE TO RELATED APPLICATION

This application claims priority to and the benefit of U.S. Patent Application No. 61/730,169 filed in the USPTO on Nov. 27, 2012, and priority to and the benefit of Korean Patent Application No. 10-2013-0132380, filed with the Korean Intellectual Property Office on Nov. 1, 2013, the entire contents of which are incorporated herein by reference.

BACKGROUND (a) Field

Exemplary embodiments relate to a cable compensation circuit that compensates a voltage drop caused by cables, and a power supply including the same. For example, the cable compensation circuit compensates a voltage drop occurring in a cable connected between a power supply and a battery.

(b) Description of the Related Art

A cable is connected between an output capacitor of a charger and a battery. A voltage drop occurring in the cable is negligible when an output current of the charger is low (i.e., when a load is light). However, when the output current is high (i.e., when the load is heavy), the voltage drop is increased so that a voltage supplied to the battery is decreased.

An output voltage of the charger is controlled to be a rated voltage that is appropriate for battery charging, but the voltage supplied to the battery may be lower than the rated voltage due to the voltage drop in the cable.

The above information disclosed in this Background section is only for enhancement of understanding of the background of the invention and therefore it may contain information that does not form the prior art that is already known in this country to a person of ordinary skill in the art.

SUMMARY

Exemplary embodiments have been made in an effort to provide a cable compensation circuit that can compensate a voltage drop due to a cable, and a power supply including the same.

Exemplary embodiments are related to a cable compensation circuit and a power supply. The cable compensation circuit compensates a voltage drop in a cable coupled between the power supply and a load.

A cable compensation circuit includes a node where a voltage that depends on an input voltage of the power supply during a turn-on period of a power switch of the power supply and depends on an output voltage of the power supply during a turn-off period of the power switch is generated, a sensing RC filter configured to generate a sense voltage that depends on a diode current by filtering the voltage of the node, and an averaging RC filter configured to generate an average voltage by averaging the sense voltage.

According to an exemplary embodiment, a circuit compensating a voltage drop in a cable coupled between a power supply and a load includes a first node where a voltage that depends on an input voltage of the power supply during a turn-on period of a power switch of the power supply and depends on an output voltage of the power supply during a turn-off period of the power switch is generated, a sensing RC filter generating a sense voltage that depends on a diode current flowing to an output end of the power supply by filtering the voltage of the first node, and an averaging RC filter generating an average voltage by averaging the sense voltage.

The sensing RC filter includes a first resistor including a first end coupled to the first node and a first capacitor coupled to a second end of the first resistor, and a voltage of a second node to which the first resistor and the first capacitor are coupled is the sense voltage.

The sensing RC filter further includes a diode being coupled in parallel with the first capacitor to clamp the sense voltage.

A slope of the sense voltage is changed to a slope that is based on the voltage of the first node. The voltage of the first node corresponds to the input voltage during the turn-on period of the power switch and corresponds to the output voltage during the turn-off period of the power switch.

The averaging RC filter includes a second resistor including a first end coupled to the sense voltage and a second capacitor coupled to a second end of the second resistor, and a voltage of a third node where the second resistor and the second capacitor are coupled is the average voltage.

The average voltage and a load current supplied to a load are proportional to a square of a duty cycle of the power switch.

According to an exemplary embodiment, a power supply coupled with a load through a cable includes a power switch, a feedback circuit configured to generate a feedback signal based on an output voltage supplied to the load, a gate driver configured to control a switching operation of the power switch based on the feedback signal, and a cable compensation circuit configured to generate a sense voltage that depends on a diode current flowing to an output end of the power supply by filtering a first voltage that depends on an input voltage of the power supply during a turn-on period of the power switch and depends on the output voltage during a turn-off period of the power switch and generate an average voltage by averaging the sense voltage.

The power supply further includes a transformer including a primary side winding coupled between the power switch and the input voltage and a secondary side winding coupled to the output voltage. The first voltage is a voltage of the secondary side winding.

The cable compensation circuit includes a first resistor including a first end coupled to the first voltage and a first capacitor coupled to a second end of the first resistor, and a voltage of a node where the first resistor and the first capacitor are coupled is the sense voltage.

The cable compensation circuit further includes a diode being coupled in parallel with the first capacitor to clamp the sense voltage.

A slope of the sense voltage is changed to a slope that is based on the first voltage.

A voltage of the first capacitor depends on the first voltage and the time constant of the first resistor and the first capacitor, and a result of differentiating the voltage of the first capacitor with respect to time is proportional to the first voltage.

The first voltage corresponds to the input voltage during a turn-on period of the power switch and corresponds to the output voltage during a turn-off period of the power switch.

The cable compensation circuit includes a second resistor including a first end coupled to the sense voltage and a second capacitor coupled to a second end of the second resistor, and a voltage of a node where the second resistor and the second capacitor are coupled is the average voltage.

The power supply further includes a transformer including a primary side winding coupled between the power switch and the input voltage and a secondary side winding coupled to the output voltage and an auxiliary winding coupled to the second side winding with a predetermined turn ratio, and the first voltage is a voltage of the auxiliary voltage.

The feedback circuit includes a shunt regulator controlling a sink current flowing to a cathode based on the output voltage, and cathode impedance of the shunt regulator is changed based on the average voltage.

The cable compensation circuit further includes a resistor coupled between a reference end of the shunt regulator and the average voltage.

The cable compensation circuit and the power supply according to the exemplary embodiments of the invention can compensate an increase of power consumption in a cable due to an increase of a load current by precisely reflecting the increase of the load current.

DETAILED DESCRIPTION OF THE EMBODIMENTS

Figure 1:
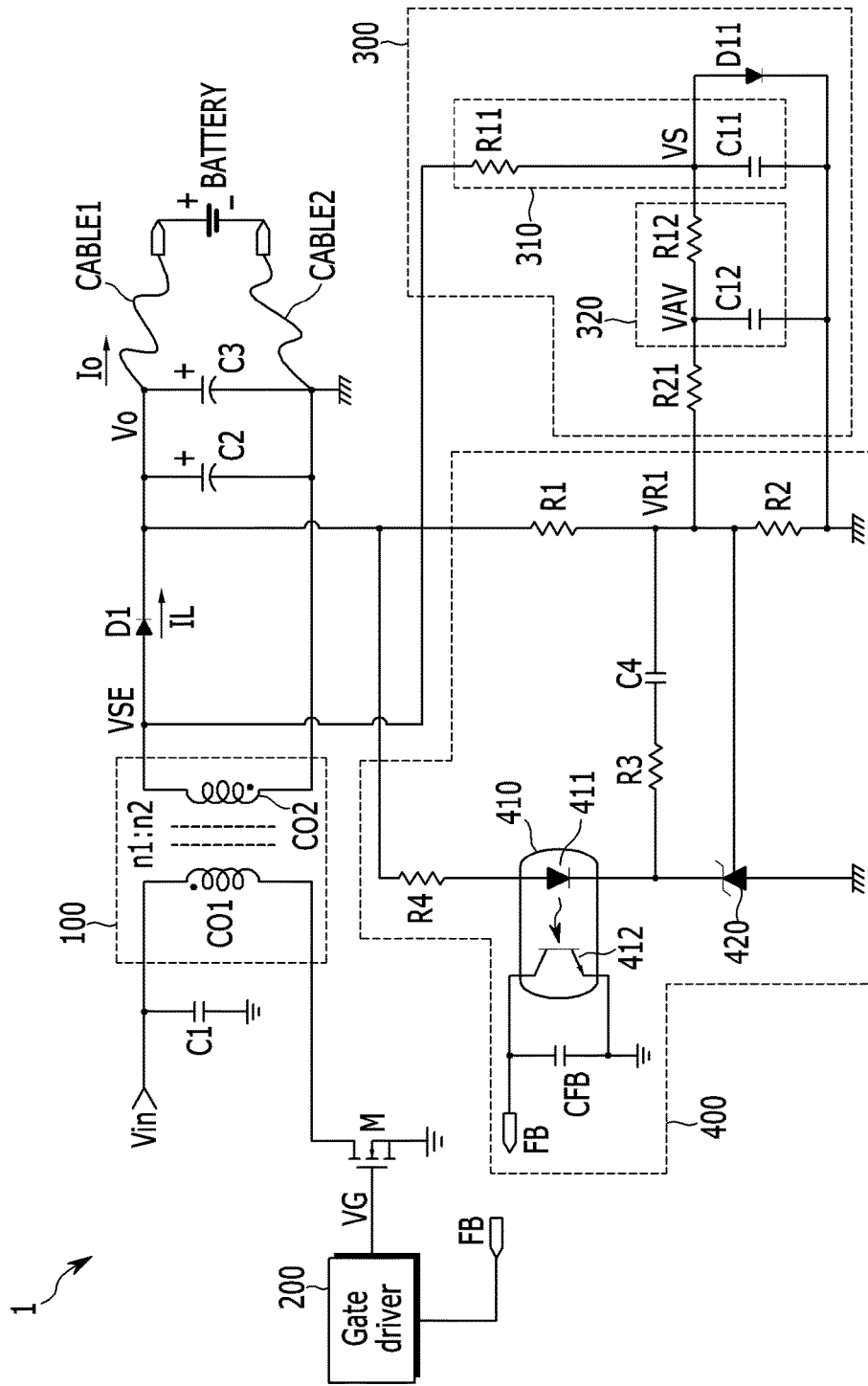
FIG. 1 shows a cable compensation circuit according to a first exemplary embodiment.

In the following detailed description, only certain exemplary embodiments have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, cable compensation circuits according to exemplary embodiments will be described in detail with reference to FIG. 1 to FIG. 3.

FIG. 1 shows a cable compensation circuit according to an exemplary embodiment. A cable compensation circuit 300 according to the exemplary embodiment is connected to a secondary side of a power supply 1 and controls operation of a feedback circuit according to a load.

The power supply 1 includes a capacitor C1, a transformer 100, a rectifier diode D1, output capacitors C2 and C3, a power switch M, a gate driver 200, and a feedback circuit 400.

An input voltage Vin is smoothened by the capacitor C1 and the smoothened input voltage is transmitted to a primary side of the transformer 100.

The transformer 100 includes a primary side winding CO1 and a secondary side winding CO2, and has a turn ratio of n1:n2 (a winding number of CO1: a winding number of CO2).

A first end of the primary side winding CO1 is supplied with the input voltage Vin and a second end of the primary side winding CO1 is connected with the power switch M. Energy stored in the primary side winding CO1 during a turn-on period of the power switch M is transmitted to the secondary side winding CO2 during a turn-off period of the power switch M.

An output of the gate driver 200 is connected to a gate electrode of the power switch M, and the power switch M performs switching operation according to a gate voltage VG output from the gate driver 200. Since the power switch M is an n-channel type transistor, the power switch M is turned on by a high-level gate voltage VG and turned off by a low-level gate voltage VG.

The gate driver 200 generates the gate voltage VG according to a feedback signal FB. For example, the gate driver 200 generates a gate voltage VG to decrease energy transmitted to the secondary side as a voltage of the feedback signal FB is decreased, and generates a gate voltage VG to increase energy transmitted to the secondary side as the voltage of the feedback signal FB is increased.

The rectifier diode D1 is connected between a first end of the secondary side winding CO2 and an output end, and is conducted during the turn-off period of the power switch M. A current transmitted to the secondary side is transmitted to the load through the rectifier diode D1.

In the exemplary embodiment, a battery is an example of the load. An output end of the power supply 1 is connected to the battery through cables CABLE1 and CABLE2. The power supply 1 functions as a charger that supplies a charging current to the battery. The output capacitors C2 and C3 are connected to the output end of the power supply 1 in parallel, the cable CABLE1 is connected to first ends of the output capacitors C2 and C3 and a positive (+) terminal of the battery, and the cable CABLE2 is connected to second ends (i.e., secondary side ground) of the output capacitors C2 and C3 and a negative (−) terminal of the battery.

A load current Io flows to the load from the output capacitors C2 and C3 through the cable CABLE1. The output capacitors C2 and C3 smoothen an output voltage Vo by attenuating a ripple of the output voltage Vo.

The feedback circuit 400 generates a feedback signal that corresponds to the output voltage Vo. The feedback circuit 400 includes an opto-coupler 410, a shunt regulator 420, four resistors R1 to R4, and a capacitor C4. The opto-coupler 410 includes an opto-diode 411 and an opto-transistor 412.

The output voltage Vo is divided by the resistor R1 and the resistor R2 such that a reference voltage VR1 is generated. The shunt regulator 420 includes a reference end to which the reference voltage VR1 is input, a cathode connected to a cathode of the opto-diode 411, and an anode connected to a ground.

The shunt regulator 420 generates a sink current according to a difference (hereinafter referred to as a reference of the shunt regulator 420) between the reference voltage VR1 which is a voltage of the reference end and a ground voltage which is a voltage of the anode. Thus, when the output voltage Vo is increased, the current sunk through the opto-diode 411 is increased by the shunt regulator 420, and when the output voltage Vo is decreased, the current sunk through the opto-diode 411 is decreased by the shunt regulator 420.

A gain of the shunt regulator 420 is determined by the capacitor C4 and the resistor R3 connected between the reference end and the cathode of the shunt regulator 420. The gain of the shunt regulator 420 corresponds to a ratio between a voltage variation of the reference end and a cathode voltage variation.

The resistor R4 is connected between the output voltage Vo and an anode electrode of the opto-diode 411. The resistor R4 supplies a bias current of the shunt regulator 420, and at the same time affects a gain of the entire system.

The exemplary embodiment is not limited thereto, and a resistor supplying a bias current to the shunt regulator 420 may be additionally provided in parallel in the opto-coupler.

A current flowing to the opto-transistor 412 is proportional to a current flowing to the opto-diode 411. A capacitor CFB is connected in parallel with the opto-transistor 412. The current flowing to the opto-transistor 412 is increased as the current flowing to the opto-diode 411 is increased, and the capacitor CFB is discharged in accordance with the current increase of the opto-transistor 412 such that a voltage of the feedback signal FB is decreased.

The current flowing to the opto-transistor 412 is decreased as the current flowing to the opto-diode 411 is decreased, and the capacitor CFB is charged in accordance with the current decrease of the opto-transistor 412 such that the voltage of the feedback signal FB is increased.

The output voltage Vo is decreased as the load is increased so that the voltage of the feedback voltage FB is increased. Then, the gate driver 200 controls the switching operation to increase energy transmitted to the secondary side. For example, the gate driver 200 may increase an on-duty cycle of the gate voltage VG.

The output voltage Vo is increased as the load is decreased so that the voltage of the feedback signal FB is decreased. Then, the gate driver 200 controls the switching operation to decrease energy transmitted to the secondary side. For example, the gate driver 200 may decrease the on-duty cycle of the gate voltage VG.

The cable compensation circuit 300 controls cathode impedance of the shunt regulator 420 according to a load current Io. For example, the cable compensation circuit 300 decreases the reference of the shunt regulator 420 as the load current Io is increased to thereby increase the cathode impedance of the shunt regulator 420. Then, the current flowing to an opto-diode 411 is decreased so that energy transmitted to the secondary side is increased.

That is, the cable compensation circuit 300 can control a voltage of the feedback voltage FB by controlling the reference end voltage of the shunt regulator 420.

For example, the cable compensation circuit 300 includes a sensing RC filter 310, an averaging RC filter 320, a resistor R21, and a diode D11. The cable compensation circuit 300 generates a sense voltage VS that depends on a diode current IL by using the sensing RC filter 310 connected to the secondary side voltage, and generates an average voltage VAV of the sense voltage VS by using the averaging RC filter 320 connected to the sense voltage VS.

The average voltage VAV may be a value that is proportional to the load current Io. The average voltage VAV is transmitted to the reference end of the shunt regulator 420 through the resistor R21, and the reference voltage VR1 is controlled not only according to the output voltage Vo but also according to the average voltage VAV.

The sensing RC filter 310 includes a first resistor R11 and a first capacitor C11, and the diode D11 is connected in parallel with the first capacitor C11. A first end of the first resistor R11 is connected to a first end of the secondary winding CO2. A secondary side voltage VSE is a voltage at the first end of the secondary side winding CO2.

The diode D11 clamps a voltage of the capacitor C11. For example, when a charging voltage of the capacitor C11 is increased to a forward voltage of the diode D11, the diode D11 is turned on and thus clamps the voltage of the capacitor C11 to prevent the voltage of the capacitor C11 from being higher than the forward voltage. Then, a ripple voltage of the sense voltage VS is moved in parallel so as to make the ripple voltage exist in a negative portion rather than in a positive portion.

A second end of the first resistor R11 is connected to the first end of the first capacitor C11 and an anode of the diode D11. The second end of the first capacitor C11 and a cathode of the diode D11 are connected to the secondary side ground. A voltage of a node where the second end of the first resistor R11 and the first end of the first capacitor C11 are connected is the sense voltage VS.

The averaging RC filter 320 includes a second resistor R12 and a second capacitor C12. A first end of the second resistor R12 is connected to the sense voltage VS, and a second end of the second resistor R12 is connected to a first end of a resistor R21 and a first end of the second capacitor C12.

A second end of the resistor R21 is connected to the reference end of the shunt regulator 420, and a second end of the second capacitor C12 is connected to the secondary side ground. A voltage of a node where the second end of the second resistor R12 and the first end of the second capacitor C12 are connected is the average voltage VAV.

The average voltage VAV that indicates the load current Io is transmitted to the reference end of the shunt regulator 420 through the resistor R21. Then, the shunt regulator 420 can control the gate driver 200 with the load current Io. Compared to the original feedback loop, the portion the load current Io affects to the control loop with is determined by the value of the resistor R21.

Figure 2:
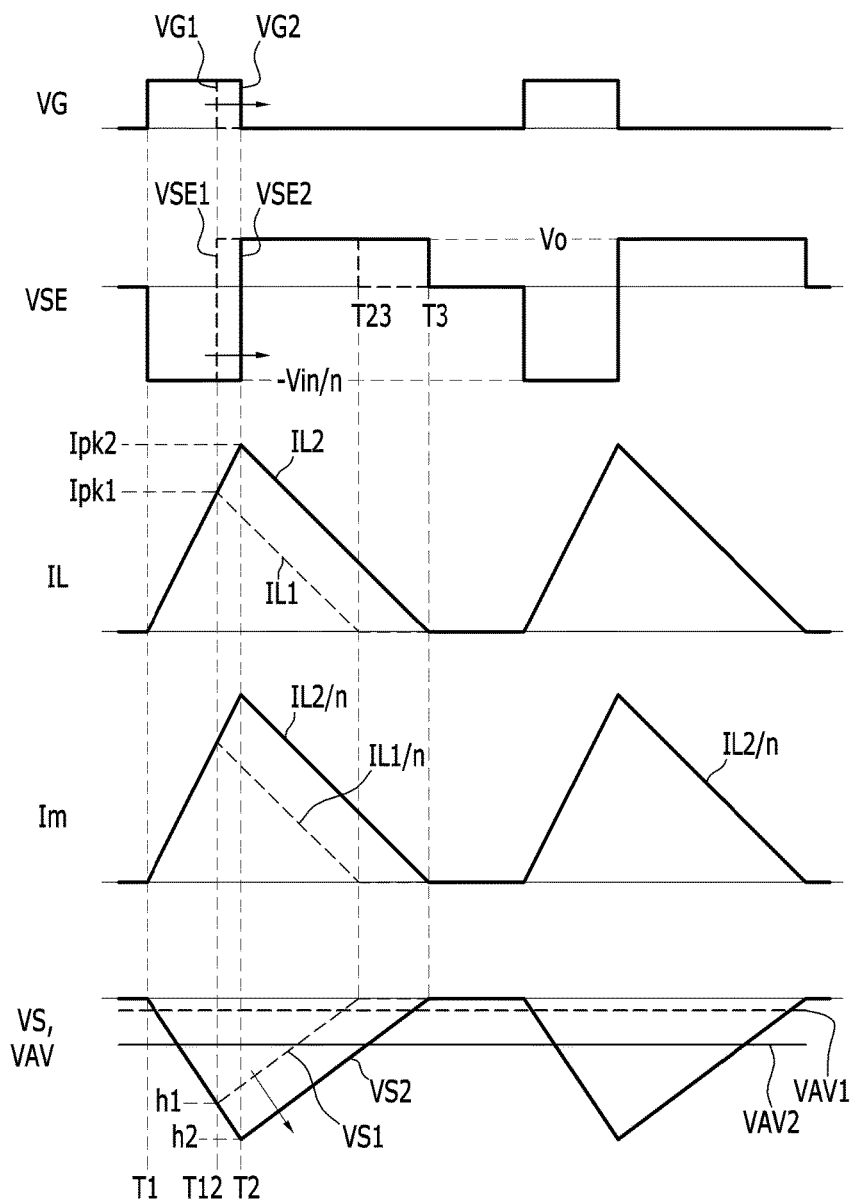
FIG. 2 shows a gate voltage, a secondary side voltage, a diode current, a magnetizing current, a sense voltage, and an average voltage according to the exemplary embodiment.

FIG. 2 shows the gate voltage, the secondary side voltage, the diode current, the magnetizing current, the sense voltage, and the average voltage according to the exemplary embodiment.

The magnetizing current Im has the same waveform as the diode current IL but the scale is different according to a turn ratio (n1:n2, n1/n2). Hereinafter, the turn ratio n1/n2 will be denoted as n.

In addition, in FIG. 2, a gate voltage, the secondary voltage, the diode current, the magnetizing current, the sense voltage, and the average voltage before and after the load increase are overlapped for convenience of description.

The magnetizing current Im corresponding to a diode current IL1 before the load increase is illustrated using a dotted line, and the magnetizing current Im corresponding to a diode current after the load increase is illustrated using a solid line.

Further, in FIG. 2, the gate voltage VG, the secondary side voltage VSE, the sense voltage VS, and the average voltage VAV before the load increase are illustrated using dotted lines. Hereinafter, the gate voltage VG before the load increase is VG1, the secondary side voltage VSE before the load increase is VSE1, the sense voltage VS before the load increase is VS1, and the average voltage VAV before the load increase is VAV1. The gate voltage VG after the load increase is VG2, the secondary side voltage VSE after the load increase is VSE2, the sense voltage VS after the load increase is VS2, and the average voltage VAV after the load increase is VAV2.

Due to the increase of the load, the duty cycle of the power switch M is increased. In FIG. 2, the increased duty cycle of the power switch M is set to a duty cycle in consideration of the load increase and voltage drop compensation in the cables according to the load increase.

As shown in FIG. 2, the gate voltage VG1 is increased to high level at T1 and decreased to low level at T12. The gate voltage VG2 is increased to high level at T1 and decreased to low level at T2. The turn-on period of the power switch M is T1 to T12 (i.e., first turn-on period) in the duty cycle before the load increase, and the turn-on period of the power switch M is T1 to T2 (i.e., second turn-on period) in the duty cycle after the load increase.

Due to the increase of duty cycle, the conduction time of the magnetizing current Im and the peak of the magnetizing current Im are increased as shown from the waveform IL1/n denoted using the dotted line to the waveform IL2/n denoted using the solid line.

The diode current IL (or magnetizing current Im) is a triangular waveform increasing during the turn-on period of the power switch M and decreasing during the turn-off period of the power switch M.

The sense voltage VS according to the exemplary embodiment is generated to be linearly changed according to the diode current IL through the sensing RC filter 310. That is, the negative peak and the generation width of the triangular waveform of the sense voltage VS are also increased according to the increase of the diode current IL.

In further detail, a RC time constant is determined according to the first resistor R11 and the first capacitor C11 of the sensing RC filter 310.

A voltage of the first capacitor C11 is changed according to an exponential curve that depends on the RC time constant. In this case, the voltage of the first capacitor C11 is changed in proportion to a voltage supplied to the sensing RC filter 310 for a short period from a time from which supply of a voltage to the sensing RC filter 310 is started.

In the exemplary embodiment, a switching cycle of the power switch M is a short period, and thus the sensing RC filter 310 can generate a sense voltage VS that changes in proportion to the secondary side voltage VSE for switching cycle.

Equation 1 shows a voltage of the first capacitor C11 as a function of the voltage $V_A$ supplied to the sensing RC filter 310 according to time. The sense voltage VS of the sensing RC filter 310 is equal to the voltage of the first capacitor C11.

$$v_C(t) = V_A \left(1 - e^{-\frac{t}{R_{11}C_{11}}}\right) \quad \text{[Equation 1]}$$

Herein, Vc(t) denotes a voltage of the first capacitor C11 according to time, and R11*C11 denotes a value acquired by multiplication of capacitance of the first capacitor C11 and a resistance value of the first resistor R11.

A slope of an exponential curve at the beginning can be acquired by differentiating Equation 1, and thus it is obvious that the sense voltage VS is changed in proportion to the voltage $V_A$ supplied to the sensing RC filter 310 as given in Equation 2.

$$\left.\frac{dv_C(t)}{dt}\right|_{t=0} = \frac{V_A}{R_{11}C_{11}} e^{-\frac{t}{R_{11}C_{11}}}\bigg|_{t=0} = \frac{V_A}{R_{11}C_{11}} \propto V_A \quad \text{[Equation 2]}$$

In the exemplary embodiment, the voltage supplied to the sensing RC filter 310 is the secondary side voltage VSE. Thus, the sense voltage VS of the sensing RC filter 310 according to the exemplary embodiment is changed with a slope that depends on the secondary side voltage VSE. That is, the slope of the sense voltage VS is changed in accordance with a change of the secondary side voltage VSE.

For example, in the turn-on period of the power switch M, the secondary side voltage VSE is a negative voltage acquired by dividing the input voltage Vin with the turn ratio n during the turn-on period of the power switch M, and, in the turn-off period of the power switch M, the secondary side voltage VSE is a positive voltage that depends on the output voltage Vo for a period during which the diode current IL flows.

As shown in FIG. 2, the sense voltage VS has a waveform that is decreased with a negative slope during the turn-on period, increased with a positive slope during the turn-off period, and reaches zero and is thus maintained with zero voltage assuming a forward voltage drop of the diode D11 is zero. Then, the waveform of the sense voltage VS is changed in accordance with the diode current IL.

For example, the dot-lined sense voltage VS1 represents a triangular waveform that is changed according to the diode current IL1. In this case, the polarity of the sense voltage VS1 is opposite to the polarity of the diode current IL1. That is, when the diode current IL1 is increased, the sense voltage VS1 is decreased with a negative slope in a negative voltage level (in this case, an absolute value of the sense voltage VS1 is increased), and when the diode current IL1 is decreased, the sense voltage VS1 is increased with a positive slope in the negative voltage level (in this case, the absolute value of the sense voltage VS1 is decreased).

The secondary side voltage VSE1 before the load increase is a negative voltage −Vin/n that is acquired by dividing the input voltage Vin with the turn ratio n during a first on-period T1 to T12, and is increased to the output voltage Vo at T12 which is a time that the power switch M is turned off and then maintained with the output voltage Vo for a period during which the diode current IL1 flows. At T23, the diode current IL1 becomes zero and the secondary side voltage VSE1 also becomes zero voltage.

Since the secondary side voltage VSE1 is passed through the sensing RC filter 310, the sense voltage VS1 starts to decrease from T1 with a negative slope during the first on-period T1 to T12.

The sense voltage VS1 starts to increase from T12 and reaches zero voltage at T23.

During the condition when a turn-on period of the power switch M is the first on-period T1 to T12, the average voltage VAV1 is a negative voltage generated by filtering the sense voltage VSE1 using the averaging RC filter 320.

In another case, a duty cycle is increased due to the load increase, and the power switch M is turned on during a second on-period T1 to T2.

The secondary side voltage VSE2 is maintained at −Vin/n during the second on-period T1 to T2, is increased to the output voltage Vo at T2, and then becomes zero voltage at T3 at which the diode current IL2 becomes zero.

At a negative voltage level, the sense voltage VS2 is decreased with a negative slope from T1 to T2, and is increased with a positive slope from T2 to T3. A lowest level h2 of the sense voltage VS2 is lower than a lowest level h1 of the sense voltage VS1 (i.e., the absolute value is higher).

During the condition when a turn-on period of the power switch M is the second on-period T1 to T2, the average voltage VAV2 is a negative voltage generated by filtering the sense voltage VS2 using the averaging RC filter 320.

The load current Io is in proportion to a square of the duty cycle and the average voltage VAV is also in proportional to the square of the duty cycle, and therefore the average voltage VAV directly follows the load current Io.

Equation 3 represents the load current according to the exemplary embodiment.

[Equation 3]

$$I_{pk} = \frac{V_{IN} dT_S}{L_m}$$

$$w = \frac{\frac{L_m}{n^2} n I_{pk}}{V_O} = \frac{L_m}{nV_O} I_{pk} = \frac{L_m}{nV_O} \cdot \frac{V_{IN} dT_S}{L_m} = \frac{V_{IN}}{nV_O} dT_S$$

$$I_O = \frac{1}{2T_S} n I_{pk} w = \frac{1}{2T_S} \cdot \frac{n V_{IN} dT_S}{L_m} \cdot \frac{V_{IN}}{nV_O} dT_S = \frac{1}{2} \frac{V_{IN}^2 T_S}{L_m V_O} d^2 \propto d^2$$

Herein, Ipk denotes a peak current flowing to the power switch M, d is a duty cycle, Ts is a switching cycle, Lm is magnetizing inductance, w is a turn-on time of the secondary side diode D1, n is a turn ratio (n1/n2), and Vo is an output voltage.

FIG. 2 illustrates a peak current Ipk1 before the load increase and a peak current Ipk2 after the load increase.

Equation 4 represents the average voltage according to the exemplary embodiment.

[Equation 4]

$$h = \frac{\frac{V_{IN}}{n} dT_S}{R_{11} C_{11}}$$

$$w = \frac{R_{11} C_{11} h}{V_O} = \frac{R_{11} C_{11}}{V_O} \cdot \frac{\frac{V_{IN}}{n} dT_S}{R_{11} C_{11}} = \frac{V_{IN}}{nV_O} dT_S$$

$$VAV = \frac{1}{2T_S} h(dT_S + w) = \frac{1}{2T_S} \frac{\frac{V_{IN}}{n} dT_S}{R_{11} C_{11}} \left( dT_S + \frac{V_{IN}}{nV_O} dT_S \right) =$$

$$\frac{1}{2} \frac{\frac{V_{IN}}{n} T_S}{R_{11} C_{11}} \left( 1 + \frac{V_{IN}}{nV_O} \right) d^2 \propto d^2$$

Herein, h denotes a negative peak of a triangular waveform of the sense voltage VS. FIG. 2 illustrates the peak h1 of the sense voltage VS before the load increase and the peak h2 of the sense voltage VS after the load increase.

As shown in Equation 3 and Equation 4, the load current Io and the average voltage VAV are proportional to the square of the duty cycle d. Thus, the variation of the load current Io can be precisely reflected to the average voltage VAV according to the exemplary embodiment.

Since the voltage at the reference end of the shunt regulator 420 depends on the average voltage VAV, the feedback voltage FB is determined in consideration of a variation of the load current Io, together with a variation of the output voltage Vo that depends on the load variation.

Then, the output voltage Vo can be controlled with reflection of a voltage drop that occurs in the cable due to the increase of the load current Io.

For example, the average voltage VAV is changed to a voltage VAV2 that is lower than the voltage VAV1 according to the increase of the load current Io such that a voltage of the reference end of the shunt regulator 420 is more decreased. Then, the current flowing through the shunt regulator 420 is decreased so that the feedback voltage VFB is more increased.

Then, the gate driver 200 increases the duty cycle of the power switch M with a width that can compensate the voltage drop in the cable. After that, the duty cycle is maintained unless the load is increased.

In the exemplary embodiment, the sensing RC filter generates a sense voltage that depends on a diode current using a secondary side voltage, but the exemplary embodiment is not limited thereto.

The cable compensation circuit can generate a sense voltage using a voltage that depends on an input voltage of the power supply during the turn-on period of the power switch and an output voltage of the power supply during the turn-off period of the power switch.

Figure 3:
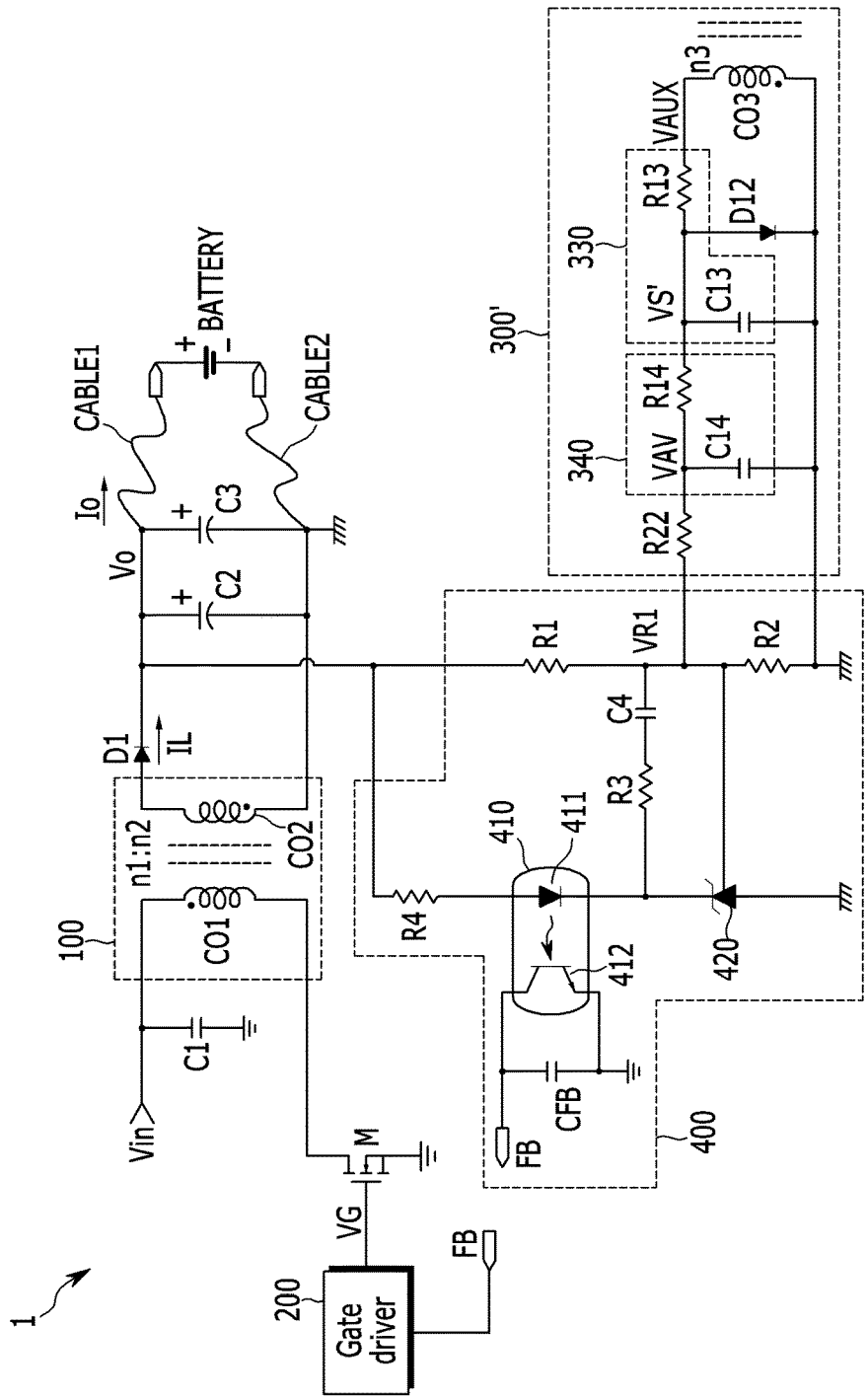
FIG. 3 shows a power supply according to another exemplary embodiment.

FIG. 3 shows a power supply according to another exemplary embodiment.

Unlike the previously-described exemplary embodiment, a cable compensation circuit 300' shown in FIG. 3 uses an auxiliary voltage VAUX of an auxiliary winding CO3 instead of using a secondary side voltage VSE. The auxiliary winding CO3 is provided in the secondary side, and is coupled with a secondary side winding CO2 with a predetermined turn ratio n3/n2.

Thus, a turn ratio n in the other exemplary embodiment becomes n1/n3 (i.e., turns of a primary side winding CO1/ turns of the auxiliary winding CO3).

Since the auxiliary voltage VAUX is a voltage acquired by multiplying the turn ratio n3/n2 to the secondary side voltage VSE, the auxiliary voltage VAUX has the same waveform of the secondary side voltage VSE but has a different scale.

For example, when a level of the secondary side voltage VSE is not sufficient to sense a load current Io, the auxiliary voltage VAUX may be used.

The cable compensation circuit 300' includes a sensing RC filter 330 and an averaging RC filter 340.

The sensing RC filter 330 generates a sense voltage VS' that depends on a diode current IL by filtering the auxiliary voltage VAUX. In this case, operation of the sensing RC filter 310 is the same as that of the sensing RC filter 310. That is, the sensing RC filter 310 generates a sense voltage VS', which is a triangular waveform having a slope that depends on the input voltage of the RC filter, that is, the auxiliary voltage VAUX.

The sensing RC filter 330 includes a third resistor R13 and a third capacitor C13. A first end of the third resistor R13 is connected to a first end of the auxiliary winding CO3, a second end of the third resistor R13 is connected to a first end of the third capacitor C13, and a second end of the third capacitor C13 is connected to a secondary side ground.

As in the previous exemplary embodiment, a diode D12 is connected between the second end of the third resistor R13 and the secondary side ground.

Like the averaging RC filter 320 of the previous exemplary embodiment, the averaging RC filter 340 generates an average voltage VAV' of the sense voltage VS'.

The averaging RC filter 340 includes a fourth resistor R14 and a fourth capacitor C14. A first end of the fourth resistor R14 is connected to the sense voltage VS', and a second end of the fourth resistor R14 is connected to a first end of a resistor R22 and a first end of the fourth capacitor C14.

A second end of the resistor R22 is connected to a reference end of a shunt regulator 420, and a second end of the fourth capacitor C14 is connected to the secondary side ground. A voltage of a node where the second end of the fourth resistor R14 and the first end of the fourth capacitor C14 are connected is the average voltage VAV'.

As described, in the exemplary embodiments, an increase of power consumption in the cable due to an increase of the load current can be compensated by precisely reflecting the increase of the load current.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS power supply 1,
capacitor (C1, C4, C11, C12, C13, C14)
transformer 100
cable compensation circuit 300 and 300'
rectifier diode D1, output capacitor C2 and C3, power switch M
gate driver 200, feedback circuit 400, primary side winding CO1
secondary side winding CO2
auxiliary winding CO3
opto-coupler 410
shunt regulator 420
resistor R1-R3, R11-R14, R21-R22
opto-diode 411, opto-transistor 412
diode D11-D12

What is claimed is:

1. A cable compensation circuit compensating a voltage drop in a cable coupled between a power supply and a load, comprising:
a first node where a voltage that depends on an input voltage of the power supply during a turn-on period of a power switch of the power supply and depends on an output voltage of the power supply during a turn-off period of the power switch is generated;
a sensing resistor-capacitor (RC) filter including a first capacitor and a first resistor, and configured to generate, on an end of the first capacitor, a sense voltage that depends on a diode current flowing to an output end of the power supply by filtering the voltage of the first node; and
an averaging RC filter including a second capacitor and a second resistor, and configured to generate, on an end of the second capacitor, an average voltage by averaging a voltage value of the sense voltage,
wherein the diode current flows through a rectifier diode,
wherein the first resistor includes a first end directly coupled to the first node,
wherein the second resistor includes a first end coupled directly to the sense voltage and a second end directly coupled to the second capacitor, and
wherein the first node is coupled directly to an anode of the rectifier diode.

2. The cable compensation circuit of claim 1, wherein the sensing RC filter comprises:
the first capacitor coupled to a second end of the first resistor, and
wherein a voltage of a second node to which the first resistor and the first capacitor are coupled is the sense voltage.

3. The cable compensation circuit of claim 2, wherein the sensing RC filter further comprises a clamping diode coupled in parallel with the first capacitor to clamp the sense voltage to a forward voltage of the clamping diode.

4. The cable compensation circuit of claim 2, wherein the first node is directly coupled to a secondary winding of a transformer, the power switch is coupled to a primary winding of the transformer, and switching of the power switch causes a slope of the sense voltage to change.

5. The cable compensation circuit of claim 4, wherein the voltage of the first node corresponds to the input voltage during the turn-on period of the power switch, and corresponds to the output voltage during the turn-off period of the power switch.

6. The cable compensation circuit of claim 2, wherein the averaging RC filter comprises:
wherein a voltage of a third node to which the second resistor and the second capacitor are coupled is the average voltage.

7. The cable compensation circuit of claim 6, wherein the average voltage and a load current supplied to a load are proportional to a square of a duty cycle of the power switch.

8. A power supply coupled with a load through a cable, comprising:
a power switch;
a feedback circuit configured to generate a feedback signal based on an output voltage supplied to the load;
a gate driver configured to control a switching operation of the power switch based on the feedback signal; and
a cable compensation circuit configured to:
generate, on an end of a first capacitor, a sense voltage that depends on a diode current flowing to an output end of the power supply by filtering, using the first capacitor and a first resistor, a first voltage that depends on an input voltage of the power supply during a turn-on period of the power switch and depends on the output voltage during a turn-off period of the power switch, and
generate, on an end of a second capacitor, an average voltage by averaging, using the second capacitor and a second resistor, a voltage value of the sense voltage,
wherein the diode current flows through a rectifier diode,
wherein the first resistor includes a first end directly coupled to the first voltage,
wherein the second resistor includes a first end directly coupled to the sense voltage and a second end directly coupled to the second capacitor, and
wherein the first voltage is a voltage of an anode of the rectifier diode.

9. The power supply of claim 8, further comprising a transformer including a primary side winding coupled between the power switch and the input voltage and a secondary side winding coupled to the output voltage,
wherein the first voltage is a voltage of the secondary side winding.

10. The power supply of claim 9, wherein the cable compensation circuit comprises:
the first capacitor coupled to a second end of the first resistor, and
wherein a voltage of a node to which the first resistor and the first capacitor are coupled is the sense voltage.

11. The power supply of claim 10, wherein the cable compensation circuit further comprises a clamping diode coupled in parallel with the first capacitor to clamp the sense voltage to a forward voltage of the clamping diode.

12. The power supply of claim 10, wherein switching of the power switch causes a slope of the sense voltage to change.

13. The power supply of claim 12, wherein a voltage of the first capacitor depends on the first voltage and the time constant of the first resistor and the first capacitor, and
a result of differentiating the voltage of the first capacitor with respect to time is proportional to the first voltage.

14. The power supply of claim 12, wherein the first voltage corresponds to the input voltage during a turn-on period of the power switch and corresponds to the output voltage during a turn-off period of the power switch.

15. The power supply of claim 10, wherein the cable compensation circuit comprises:
wherein a voltage of a node to which the second resistor and the second capacitor are coupled is the average voltage.

16. The power supply of claim 15, wherein the load current and the average voltage are proportional to a square of the duty cycle.

17. The power supply of claim 8, wherein the feedback circuit comprises a shunt regulator configured to control a sink current flowing to a cathode based on the output voltage, and cathode impedance of the shunt regulator is changed based on the average voltage.

18. The power supply of claim 17, wherein the cable compensation circuit further comprises a resistor coupled between a reference end of the shunt regulator and the average voltage.

19. A method of compensating for a voltage drop in a cable coupled between a power supply and a load, the method comprising:
generating, on a first node, a voltage that depends on an input voltage of the power supply during a turn-on period of a power switch of the power supply and depends on an output voltage of the power supply during a turn-off period of the power switch;
generating, using a sensing resistor-capacitor (RC) filter including a first capacitor and a first resistor and on an end of the first capacitor, a sense voltage that depends on a diode current flowing to an output end of the power supply by filtering the voltage of the first node; and
generating, using an averaging RC filter including a second capacitor and a second resistor and on an end of the second capacitor, an average voltage by averaging a voltage value of the sense voltage,
wherein the diode current flows through a rectifier diode,
wherein the first resistor includes a first end directly coupled to the first node,
wherein the second resistor includes a first end directly coupled to the sense voltage and a second end directly coupled to the second capacitor, and
wherein the first node is coupled directly to an anode of the rectifier diode.

20. The method of claim 19, wherein the first node is directly coupled to a secondary winding of a transformer, the power switch is coupled to a primary winding of the transformer, and switching of the power switch causes a slope of the sense voltage to change.

* * * * *